United States Patent [19]

Loeppky et al.

[11] Patent Number: 5,087,671

[45] Date of Patent: Feb. 11, 1992

[54] POLYMERS FOR SCAVENGING NITROSATING AGENTS

[75] Inventors: Richard N. Loeppky; Yen T. Bao, both of Columbia, Mo.

[73] Assignee: The Curators of the University of Missouri, Columbia, Mo.

[21] Appl. No.: 543,349

[22] Filed: Jun. 25, 1990

[51] Int. Cl.$^5$ .............................................. C08F 8/00
[52] U.S. Cl. ............................. 525/328.2; 525/326.7; 525/328.8; 210/690; 210/692
[58] Field of Search ............ 525/374, 376, 377, 328.2, 525/326.7, 328.8, 359.3; 564/2; 210/690, 692

[56] References Cited

U.S. PATENT DOCUMENTS 4,087,561 5/1978 Bharucha et al. ................... 426/266
4,273,937 6/1981 Gum et al. ............................ 564/2

OTHER PUBLICATIONS

Taylor, "A Convenient Preparation of a Hydroquinance Redox Polymer", Journal of Applied Polymer Science, vol. VI, Issue No. 21, 5/3 (1962).
J. I. Gray et al., "Inhibition of N-Nitrosamine Formation in Model Food Systems", *J. Food. Sci.* 40: 981-984 (1975).
P. J. Groenen, "A New type of N-Nitrosation Inhibtor", *Proc. 2nd Intl. Symp. Nitrite Meat Products* pp. 171-172 (1976).
Univ. of Missouri Technology Catalog, Apr. 1988.

*Primary Examiner*—Paul R. Michl
*Assistant Examiner*—Yong S. Lee
*Attorney, Agent, or Firm*—Haverstock, Garrett and Roberts

[57] ABSTRACT

This invention relates to polymers that can be used to remove or sequester nitrosating agents such as nitrous acid, nitrous esters or thio-esters, nitrous anhydrides, nitrosyl halides, metal nitrosyls, inorganic metal nitrite complexes or similar nitrosating agents from fluid mixtures. This prevents the nitrosating agents from reacting with amines or other nitrogen-containing compound to form nitrosamines or other N-nitroso compounds, which are carcinogenic, in products such as cosmetics and other personal care items, shampoo, pesticides, rubber and rubber chemicals, commercial chemicals and prodcuts formulated from them, and metalworking fluids.

The reactive groups of this invention can be classified into three categories: (1) unsaturated electron-rich aromatic molecules such as pyrrole; (2) reducing agents such as hydroquinone; and (3) amine groups and other amino compounds.

The incorporation of reactive groups into polymeric molecules as described herein provides several advantages. For example, the polymers can form insoluble particles; the particles can be loaded into a filter bed through which a fluid can be passed, or they can be stirred into a mixture before or during a reaction and subsequently removed by filtration, settling, or other steps. Water-soluble polymeric backbones such as polyethyleneimine can be used if desired, and will provide certain advantages in some situations. Various polymers described herein have been demonstrated to be effective in scavenging nitrosating agents from fluids before an amine is added; some are also effective under competitive reaction conditions.

38 Claims, 2 Drawing Sheets

POLYMER I

POLYMER II

POLYMER III

POLYMER IV

POLYMER V

POLYMER VI

Fig. 1

POLYMER VII

POLYMER VIII

Fig. 2

POLYMERS FOR SCAVENGING NITROSATING AGENTS

GOVERNMENT SUPPORT

The research that led to this invention was supported in part by Grant No. R37 CA 26914 from the National Cancer Institute.

FIELD OF THE INVENTION

This invention is in the fields of organic chemistry and polymer chemistry, and relates to compounds that inhibit the formation of nitrosamines and related substances that may be carcinogenic, by scavenging and reacting with nitrosating agents.

BACKGROUND OF THE INVENTION

Nitrosamines have the following molecular structure:

in which $R_1$ and $R_2$ represent organic (carbon-containing) groups. In precise chemical terminology, $R_1$ and $R_2$ should represent alkyl or aryl groups, but not carbonyl groups which have C-O double bonds. If either of the alpha carbons (the carbons attached directly to the nitrogen) in a nitrosamine molecule is double-bonded to an oxygen atom, the molecule should properly be called a "nitroso-" compound (such as nitrosoamide, nitrosocarbamate, nitrosourea, etc.). However, the carbonyl/nitroso distinction is often disregarded in toxicological and medical research and in government and mass-media publications, because many nitroso compounds are carcinogens and generate the same public concerns as nitrosamines. Since the subject invention relates to methods and compounds for eliminating or reducing carcinogens, the term "nitrosamine" as used herein includes nitroso compounds.

Some types of nitrosamines have been shown to be carcinogenic in tests using laboratory animals. In general, all nitrosamines are presumed to be carcinogenic unless they've been tested and shown to be relatively harmless; for example, nitrosamines with tertiary butyl or two benzyl groups attached to the nitrogen reportedly are not carcinogenic in test animals.

Nitrosamines are often generated as undesired by-products in certain foods (especially bacon) and cosmetic and hygiene products (such as shampoo and hair conditioner). Nitrosamines are also present in various other fluids that can come into contact with the skin, such as metal-working fluids (which are used to cool and/or lubricate metal pieces during machining processes), hydraulic fluids, and in pesticides and various other commercial chemicals.

In addition, nitrosamines can be generated during the manufacturing or molding of rubber. Such nitrosamines are often released into the air, creating workplace and environmental hazards due to carcinogenic air pollution.

Nitrosamine contaminants usually result from the reaction of nitrosating agents with amines. The primary nitrosating agents are formed from the dissolution of nitrite salts, such as sodium or potassium nitrite, in acids, and the resulting mixture is often referred to as nitrous acid ($HNO_2$). In addition to nitrous acid, the other nitrosating agents contained within this mixture also may include nitrosyl halides, nitrosyl sulfuric acid, nitrous anhydride ($N_2O_3$), dinitrogentetroxide ($N_2O_4$), or nitrosyl thiocyanate, depending upon which acid is used to generate the nitrous acid and what other salts may be present. Nitrosating agents such as $N_2O_3$ and $N_2O_4$ can also form in the absence of acid and nitrite salts. They are, for example common constituents of polluted air and may form through the oxidation of NO. Nitrous esters (alkyl or aryl nitrites) of alcohols, phenols, or thiols are also nitrosating agents as are certain transition metal complexes of nitrite and NO. Nitrosation can occur during product preparation, either during heating or at moderate temperatures. It can also occur while a product sits on a shelf, especially if the product sits for months in a warehouse that becomes quite warm.

Many efforts have been made to eliminate nitrosamines from various substances, or to reduce their concentrations to the lowest practical levels. In various types of food, people and companies have used ascorbic acid (vitamin C) and alpha-tocopherol (vitamin E) and their salts to inhibit nitrosamine formation; e.g., U.S. Pat. Nos. 4,463,026 (Chendler et al 1984), 4,434,187 (Chendler et al 1984), and 4,251,563 (Czuba et al 1981). Others have used acetal and ketal derivatives of ascorbic acid (U.S. Pat. No. 4,153,613, Bharucha et al 1979). Others have used gamma-pyrone (U.S. Pat. No. 4,443,483, Sato et al, 1984). Others have used "reducing sugars," which generally comprise sugar derivatives with attached alkyl groups, such as methyl-glucoside (e.g., U.S. Pat. No. 4,435,433, Theiler, 1984). Others have used mixtures where the exact chemical composition is either unknown or unspecified, such as "an aqueous extraction of black tea leaves" (U.S. Pat. No. 4,844,925, Mai et al 1989) or "liquid smoke" (e.g., U.S. Pat. Nos. 4,414,232, Rendek et al 1983, and 4,411,922, Theiler 1983).

In the field of topical products (i.e., products that contact the skin, such as cosmetics, shampoo, and hair conditioner), U.S. Pat. No. 4,189,465 (Rosenthal 1980) discusses the use of squalene, a complex biological hydrocarbon.

In the chemical industry, compounds such as sulfamic acid, ammonium sulfamate, ammonium sulfate, urea, mercaptans, and azides have been used (often under acidic conditions) to inhibit nitrosamine formation. In the petrochemical industry, U.S. Pat. No. 4,200,542 (Sedlak 1980) describes the use of metallic salts of ascorbate and isoascorbate with vitamin E to inhibit nitrosamine formation in grease compositions.

Various researchers have reported that certain types of "unsaturated" organic molecules (i.e., molecules with at least one double-bond) can be used to inhibit nitrosamine formation. Such compounds include hydrocarbons (which contain only carbon and hydrogen atoms), carbohydrates (which also contain oxygen), and heterocyclics (molecules which have a ring structure with at least one non-carbon atom in the ring, such as nitrogen or oxygen). For example, Gray and Dugan (1975) disclosed the use of hydroquinone as a nitrosamine inhibitor in food. Subsequently, U.S. Pat. No. 4,273,937 (Gum et al 1981) disclosed that 1,4-naphthoquinone and 1,4-naphthohydroquinone were more effective than hydroquinone and could be used at lower concentrations to achieve some degree of nitrosamine reduction; however, substantial quantities of nitrosamines were still generated under the conditions they used. U.S. Pat. Nos. 4,087,561 and 4,088,793 (both by Bharucha et al 1978) disclose the use of certain hydroquinoline derivatives (such as 6-alkoxy-1,2,3,4-tetrahydroquinoline) as nitrosamine inhibitors.

The foregoing methods of inhibiting nitrosamines suffer from various limitations and shortcomings. For example, ascorbic acid and alpha-tocopherol can react to produce NO, which can be oxidized by air to yield $NO_x$, which can react with itself or NO to produce a nitrosating agent. Azides are highly toxic, while mercaptans have noxious odors. Ionic compounds (which includes salts that dissociate easily) are incompatible with many formulations, and some react more rapidly with other compounds than with nitrosating agents, which can lead to unwanted byproducts while the nitrosating agents remain as a threat to form nitrosamines.

Therefore, there remains a need for a general method of removing, sequestering, or otherwise inactivating nitrosating agents in fluid mixtures. Such a method should utilize a substance that reacts quickly with nitrosating agents, in a reaction that is not easily reversed, to form relatively stable compounds that (1) are not subsequently degraded or oxidized to form nitrosating agents or other undesired contaminants, or (2) can be easily removed from the mixture.

SUMMARY OF THE INVENTION

This invention relates to polymers that can be used to remove or sequester nitrosating agents such as nitrous acid, nitrous esters or thio-esters, nitrous anhydrides, nitrosyl halides, metal nitrosyls, inorganic metal nitrite complexes or similar nitrosating agents from fluid mixtures. This prevents the nitrosating agents from reacting with amines or other nitrogen-containing compounds to form nitrosamines or other N-nitroso compounds, which are carcinogenic, in products such as cosmetics and other personal care items, shampoo, pesticides, rubber and rubber chemicals, commercial chemicals and products formulated from them, and metalworking fluids.

The reactive groups of this invention can be classified into three categories: (1) unsaturated electron-rich aromatic molecules such as pyrrole; (2) reducing agents such as hydroquinone; and (3) amine groups and other amino compounds.

The incorporation of reactive groups into polymeric molecules as described herein provides several advantages. For example, the polymers can form insoluble particles; the particles can be loaded into a filter bed through which a fluid can be passed, or they can be stirred into a mixture before or during a reaction and subsequently removed by filtration, settling, or other steps. Water-soluble polymeric backbones such as polyethyleneimine can be used if desired, and will provide certain advantages in some situations. Various polymers described herein have been demonstrated to be effective in scavenging nitrosating agents from fluids before an amine is added; some are also effective under competitive reaction conditions.

DESCRIPTION OF THE PREFERRED EMBODIMENTS

This invention relates to a process for reducing nitrosamine formation in fluids. The process comprises the step of contacting a fluid (such as a liquid, emulsion, or gas) containing a nitrosating agent with a polymeric substance having functional groups that will react with the nitrosating agent. This will convert the nitrosating agent into a residue that cannot degrade amino or other nitrogen containing compounds into carcinogenic nitrosamines or N-nitroso compounds.

As used herein, "residue" is defined broadly to include any compound formed by the reaction of a nitrosating agent with the polymers of this invention. As described below, depending on what type of reactive groups are used, a residue which is polymeric can be created if the nitrosating agent becomes bonded to the polymers. Alternately, a residue which is not polymeric can be created if a nitrosating agent is converted into a non-nitrosating molecule which is not attached to the polymer.

In one preferred embodiment, the reactive groups of this invention are covalently attached to polymers that are not water-soluble, such as chloromethylated polystyrene. Suitable coupling reactions that can be used to attach side groups to polymeric backbone molecules are described in the examples, in various patents such as U.S. Pat. No. 3,844,985 (Fukutani et al 1974), and in articles such as Tsuchida et al 1973. Alternately, monomeric building blocks having suitable side groups or side-group precursors can be used in various polymerization reactions. If necessary, the reactive groups can be inactivated during the polymerization step by means of protecting groups, which can be removed to activate the side groups after the polymerization is completed.

The resulting polymers can be synthesized or treated using various methods that cause them to form particles, such as chips or beads, with desired sizes such as diameters in the sub-millimeter range, causing them to form powders or slurries that can range from very coarse to very fine. The particles are loaded into a reaction chamber, and are retained in the chamber by means of one or more filtering membranes or other material with an effective pore size smaller than the diameter of the beads. This creates a porous "bed" which serves as a filter. The fluid which contains (or is suspected of containing) the nitrosating agent is passed through the filter bed. The reactive groups on the polymers either remove nitrosating molecules from the filtrate that passes through the filter bed, or convert them into residues that cannot degrade amines into nitrosamines. The diameter and thickness of the filter bed, the flow rate of the fluid, and relevant conditions such as temperature or pH can be optimized for any specific use depending on the fluid being passed through the bed.

In an alternate embodiment, particulate polymers with reactive groups are stirred into a fluid mixture during a chemical process. The particles remain with the fluid for any desired period of time, such as during several sequential reactions, in a series of different reaction vessels if desired. When appropriate (e.g., before the product is bottled, or before a reaction in which they would interfere), the particles are removed from the fluid. This can be done by suitable means such as filtration, settling, or centrifugation.

In an alternate preferred embodiment, the polymeric backbone molecules to which the reactive groups are attached are soluble in solution, and can be used in homogenous reaction conditions (i.e., in fluids with a single liquid phase, as compared to liquids containing solid particles or emulsions containing small droplets). In general, homogeneous reaction conditions offer higher levels of contact between reactive groups and nitrosating agents, compared to heterogeneous solutions mixtures where most of the interactions occur only at the interfaces between the different phases.

In certain embodiments, the polymer can be left in a fluid mixture indefinitely, and unreacted reactive groups will remain to guard against the formation of nitrosamines in the future. This embodiment is well-suited to formulations such as shampoo, cosmetics, and other personal care items, as well as metal working fluids and pesticides, which would not be adversely affected by the presence of some types of soluble or semi-soluble polymers and which may be stored for very long periods (such as more than a year) before use.

In another preferred embodiment, the polymers of this invention can be reacted with nitrosating agents under homogenous conditions, and they can subsequently be removed from solution. For example, several of the polymers described in the examples are soluble in organic solvents such as methylene chloride, chloroform, tetrahydrofuran (THF), and mixtures of glacial (100%) acetic acid (HOAc) and THF. Those polymers can be removed from those solvents in various ways, such as by precipitating them out of solution by adding a second solvent. Therefore, a multi-step procedure can be used to allow such polymers to be reacted with nitrosating agents while in homogeneous solutions, and subsequently precipitated out and removed.

The reactive groups that can effectively eliminate nitrosating agents from liquid mixtures can be divided into categories, based on the mechanisms by which they are presumed to work. One category is presumed to act predominately by covalently bonding the nitrosating agents to the polymers. If the polymers are retained in a filter bed or removed from the fluid, the nitrosating agents coupled to the polymers are also removed. Alternately, if the polymers remain in the fluid, residues of the former nitrosating agents also remain in the fluid, but they are in a sequestered, covalently-bound form that does not degrade amines into nitrosamines.

The second category of reactive groups is presumed to inactivate nitrosating agents primarily by reducing them into altered forms that do not become bonded to the polymers. Even though the residues of the former nitrosating agents may remain in solution, those residues are unable to degrade amines into nitrosamines.

The third category of reactive groups comprises amine groups which are covalently bonded to polymeric backbones. Some types of amine groups (especially primary or secondary amines, which have hydrogen atoms attached to the nitrogen atoms) are presumed to react with nitrosating agents by forming covalent bonds with the nitrosating agents, as follows:

Those polymeric amines can be regarded as a subset of the first category described above.

However, other types of amino compounds (such as p-phenylenediamine, hydrazine, and ammonium sulfamate) are presumed to convert at least some types of nitrosating agents into other non-nitrosating nitrogen species that may remain in solution. Those amino compounds could be regarded as a subset of category 2 as described above.

As is well known to chemists, nitrogenous compounds often exist in molecular forms that can shift back and forth between different structures, in a quasi-equilibrium manner. Similarly, it is believed that the residues formed by either category of polymers described herein may exist in molecular forms that can shift between different structures, depending on the temperature and pH of a solution and the presence of other constituents such as oxidizing agents. In addition, it should be noted that when pyrrole groups are reacted with nitrosating agents, at least some of the reaction products contain newly-formed carbon-nitrogen bonds, rather than the nitrogen-nitrogen bonds that are characteristic of nitrosamines; this indicates that at least some nitrosating agents either (1) react directly with a carbon atom in the pyrrole ring, or (2) react with the nitrogen atom in the pyrrole ring to form a molecular structure that spontaneously rearranges. For the purposes of this invention, the specific molecular structure of any residue(s) created by a reaction between a nitrosating agent and the polymers or side groups of this invention is not crucial. The important criterion and the useful property of this invention is that the nitrosating agents are effectively removed or inactivated by the polymers described herein, in a manner which prevents those nitrosating agents from degrading amines into dangerous nitrosamines.

Each category of reactive group will be discussed in more detail below. Data on polymers containing the reactive groups in categories 1 and 2 are provided in Table 1 (non-competitive reactions) and Table 2 (competitive reactions).

Category 1: Reactive Groups That Form Covalent Bonds With Nitrosating Agents

Figure 1:
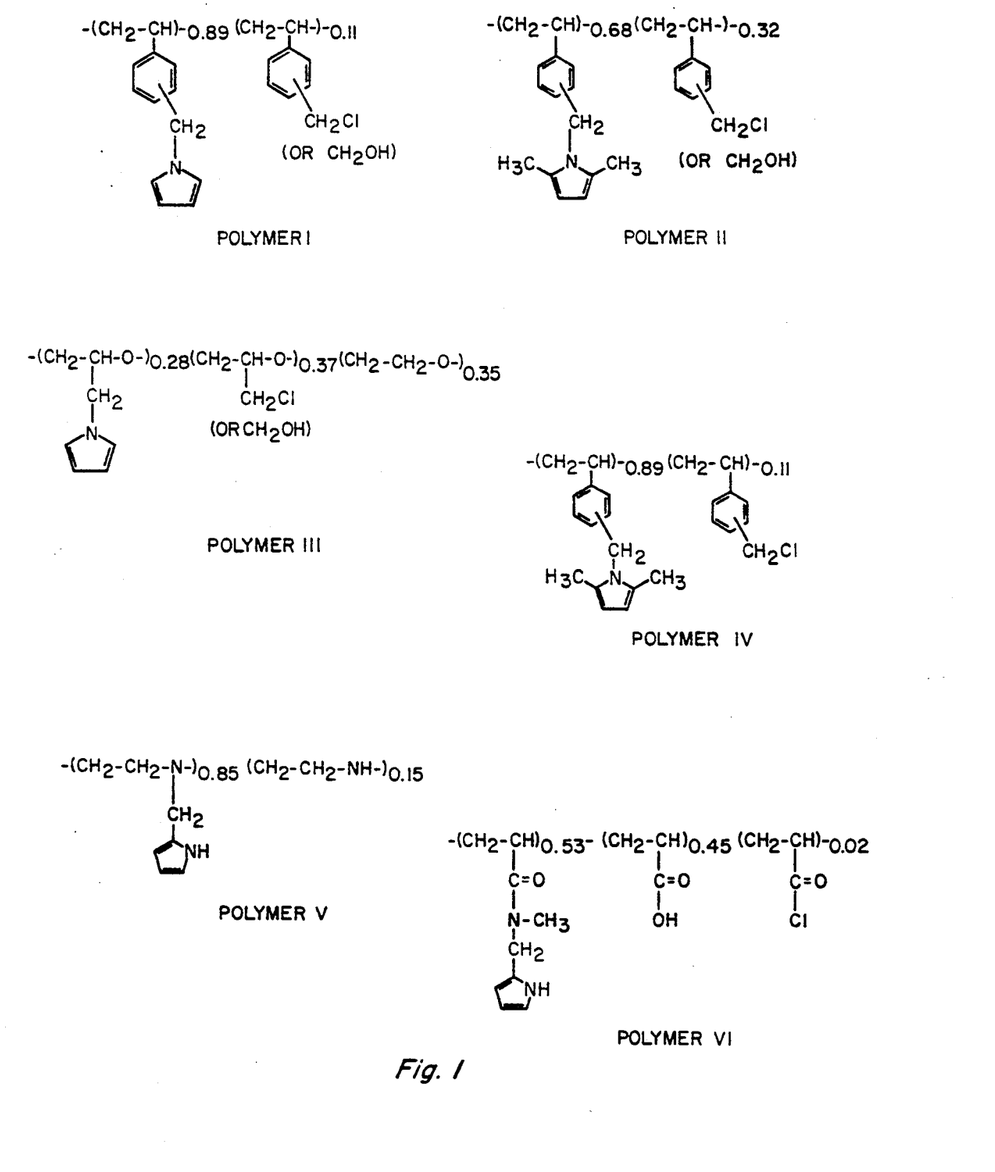
FIG. 1 shows the chemical structures of six polymers that form covalent bonds with nitrosating agents, thereby sequestering the nitrosating agents and rendering them unable to degrade amines into nitrosamines.

One class of reactive groups that have been demonstrated to be effective in preventing nitrosamine formation is assumed to form covalent bonds with some types of nitrosating agents. This assumption is based on chemical structures, theoretical considerations, and experimental data, and may be revised as more data are obtained and analyzed. Examples of such reactive groups are shown in FIG. 1 and are described in the Examples as Polymers I through VI.

A number of the reactive groups in this category which have been tested with satisfactory results are electron-rich aromatic rings. Following Huckel's Rule, aromatic rings contain alternate single and multiple bonds and/or atoms with free unshared electron pairs in a manner such that the ring contains (4n+2) pi electrons, where n is an integer. Aromatic compounds include benzene and its derivatives (such as phenol, catechol, hydroquinone, guiacol, gallic acid, pyrogallol, and phloroglucinol), pyrrole and its derivatives (such as methylpyrrole and dimethylpyrrole), indole and its derivatives, and bicyclic or polycyclic molecules that contain one or more aromatic rings. As used herein, a "derivative" of a specified compound is not limited to compounds that are synthesized using the specified compound as a starting or intermediate material; for example, a modified form of hydroquinone which contains a sulfur atom instead of an oxygen atom at a certain location would be regarded herein as a derivative of hydroquinone, even if it were synthesized by a process that never involved hydroquinone.

The preferred aromatic groups which can form covalent bonds with nitrosating agents are electron-rich, i.e., they do not contain electron-withdrawing groups attached directly to the aromatic ring. For the purposes of this invention, the phrase "electron-rich" when applied to an aromatic ring is quantified by reference to a chosen compound, as follows: It is well known from the pioneering work of Hammett and the research of many subsequent investigators that a carboxylic acid group can be used to quantitatively measure changes of electron density within an aromatic ring with respect to some standard such as benzoic acid. Carboxylic acids are weak acids and only partially dissociate in aqueous solution to give a proton ($H^+$) and a carboxylate ion ($RCOO^-$) which are in equilibrium with the parent acid (RCOOH). The equilibrium constant associated with this process is called $K_a$ and, for example, benzoic acid has a $K_a$ at 25° C. of $6.4 \times 10^{-5}$. The negative value of the logarithm (base 10) of the $K_a$ value is called the pKa; since the $\log_{10}$ of $6.4 \times 10^{-5}$ is $-4.19$, benzoic acid has pKa=4.19. Attachment of other atoms or groups of atoms (substituents) to the benzene ring of benzoic acid will alter the electron density of the ring and change the pKa of the resulting acid. The change in the pKa of the acid is determined by both the nature and the position (ortho (o), meta (m), or para (p)) of the substituent relative to the carboxylic acid group. Carboxylic acids derived from heterocyclic aromatic compounds such as pyrrole, thiophene, furan, etc. behave in a similar way. Carboxylic acids formally derived from aromatic rings more electron-rich than the unsubstituted benzene ring will have pKa's greater than 4.19, while those containing less electron-rich aromatic rings will have pKa's less than 4.19. The pKa values of 2-pyrrole and 3-pyrrole carboxylic acid are 4.45 and 5.07, respectively, indicating that the pyrrole ring is more electron rich than the unsubstituted benzene ring. The pKa value of the acid changes as its position of attachment to a heterocylic or substituted benzenoid aromatic ring changes; for the purposes of this discussion, the position of carboxylic acid attachment which gives the highest pKa value will be used as an index.

Dissociation constants (pKa values) for benzenoid aromatic compounds can be calculated using Hammett sigma ($\sigma$) values, as described in Lowry and Richardson 1987 at pages 143-159. This approach only applies to substituents which are meta or para to the carboxylic acid group. Only those substituent groups having negative Hammett sigma para ($\sigma_p$) values are capable of enhancing the electron density of the ring. This includes alkyl, aryl, OH, OR (where R is alkyl, aryl or acyl), $NH_2$, NHR, and $NR_2$ substituents. Ortho substituents directly interact with carboxylic acid group to change its pKa so that it does not function as an effective indicator of the electron density of the aromatic ring. This is also true in heterocyclic compounds when the carboxylic acid is adjacent to a heteroatom. Oxygen substituents have positive sigma meta ($\sigma_m$) values. As a result they lower the pKa of a carboxylic acid, but because of their unshared pairs increase the electron density of the aromatic ring. Therefore, for the purposes of this invention, those aromatic rings which meet the definition of being electron rich as defined in the preceding paragraph and have additional substituents with negative Hammett sigma para ($\sigma_p$) values are also classified as being electron rich regardless of the substituent position and regardless of whether the ring is heterocyclic or benzenoid.

Based on tests done to date, phenol (which has a hydroxyl group attached to a benzene ring) has been shown to be relatively weak in its ability to scavenge nitrosating agents. The carboxylic acid derivative of phenol (4-hydroxybenzoic acid, which contains a carboxyl group and a p-hydroxyl group on a benzene ring) has a pKa of 4.57. As a result, a pKa value of 4.4 has been chosen as the arbitrary reference value. Compounds whose carboxylic acid derivatives have a pKa higher than about 4.4 are classified as "electron-rich" for the purpose of this invention, and are preferred candidates for evaluation as described herein to determine whether they are effective at scavenging nitrosating agents when coupled to or contained within polymers.

Various aromatic compounds which fall within this definition of electron-rich include indole, derivatives of indole formed by ring substitution or fusion at either ring, pyrrole, and pyrrole derivatives formed by ring substitution or fusion wherein a substituent which forms the pyrrole derivative is either electronically neutral or electron-donating relative to hydrogen. Derivatives of benzene, thiophene or furan with electron-donating substituents such as hydroxy or alkoxy groups fall within this definition of electron-rich. Derivatives of benzene, thiophene or furan with primary, secondary, or tertiary amino groups also fall within this class, but reactive groups should not be coupled to the polymeric backbone via the nitrogen atom of a tertiary amino group, since reactive groups coupled to a polymer in that configuration might be cleaved from the polymer by some types of nitrosating agents. Various compounds within the class of electron-rich reactive groups that are useful for the purposes of this invention include various triphenylamine derivatives, di-tertiary-butylamino derivatives of benzene, thiophene or furan, as well as trihydroxy- or trialkoxybenzenes such as pyrrogallol, phloroglucinol, gallic acid, and similar compounds.

Any specific aromatic compound which is electron-rich according to the criteria described herein, or any specific type of amine group, can be screened to determine its effectiveness in scavenging a nitrosating agent or protecting an amine from nitrosation. The first step in such a screening process preferably should involve testing a candidate compound for its ability to react in uncoupled form (i.e., the aromatic or amine compound should not be coupled to a polymeric backbone) with nitrosating agents. This approach will reduce the complexity of the screening process, by identifying good candidates before effort is spent coupling them to polymers and analyzing the resulting modified polymers. Such testing can be done in standard solvents, or in any specific formulation in which nitrosating agents pose a potential problem.

Electron rich heterocyclic or benzenoid rings such as pyrrole can be coupled to the polymeric backbone through the nitrogen atom, through a different non-carbon atom, or through a carbon atom. Polymers containing pyrrole side groups have been created previously, as described in U.S. Pat. No. 3,844,985 (Fukutani et al 1974). Those polymers were used for entirely different purposes that are unrelated to reducing nitrosamine formation.

The reaction of pyrrole groups or certain other aromatic molecules with nitrosating agents can lead to the formation of byproducts such as nitrosopyrrole black, a black pigment that can cause severe discoloration of the mixture. However, since the by-products remains attached to the particulate substrate, the filtrate which emerges from the filter bed does not suffer from significant discoloration.

Category 2: Reactive Groups That Reduce Nitrosating Agents

The second category of reactive groups that have been demonstrated to be effective in preventing nitrosamine formation when coupled to polymers as described herein are assumed to react with at least some types of nitrosating agents, reducing those agents into other nitrogenous species that cannot form nitrosamines by reacting with amines. This second category includes reactive groups which are thermodynamically (by virtue of their reduction potential) and kinetically (by means of their rapid reaction rate) capable of reducing nitrous acid or other nitrosating agents to substances which will not react with amines to produce nitrosamines. Thermodynamically, the reactive groups must have an reduction potential less than 1 volt (compared to the hydrogen electrode at standard conditions). The reduction potential of nitrous acid to nitric oxide in acidic solution is 0.99 volt.

The reactive groups meeting this criteria, which can be easily ascertained from tabulated literature data or measured in the laboratory, must also be capable of incorporation into a polymer so that they will remain bound in either their reduced or oxidized form. Incorporation can take place either by polymerization of monomers or through the chemical modification of a polymer. Reactive groups which meet these criteria include aromatic compounds having at least one hydroxyl group attached to the ring and at least one other oxygen, in the form of a hydroxyl group, ether, or ester, attached to the ring at a position 1,2 or 1,4 to the original hydroxyl group. Derivatives of hydroquinone or catechol, or compounds produced by the fusion of aromatic or other rings to hydroquinone or catechol or to their various substituted derivatives are examples of reactive groups which meet these criteria. The aromatic ring does not have to be benzenoid but can be heterocyclic.

Other reactive groups which generally satisfy the criteria set forth above include (1) reactive groups structurally similar to those described in the preceding paragraph except one or more of the oxygen atoms is replaced by a sulfur atom; (2) reactive groups containing free thiol groups (SH); or (3) metal complexes containing certain types of reduced metal such as $Fe^{II}$ in a configuration that allows the metal to be bonded to the polymer, possibly in a chelated rather than a covalently bonded configuration. These reactive groups, or any others that satisfy the criteria listed above, can be coupled to polymers using methods known to those skilled in the art, and the resulting polymers can be tested as described herein to determine whether they effectively reduce one or more types of unwanted nitrosating agents.

Polymers in this second category may reduce some nitrosating agents into compounds such as nitric oxide (NO) which, although they do not pose a direct threat of nitrosamine formation, might be oxidized back into nitrite form or into various oxides of nitrogen ($NO_x$) that might serve as nitrosating agents if a strong oxidizing agent is present in or subsequently added to the mixture. Therefore, polymers within Category 1 (which sequester and/or remove nitrosating agents, rather than reducing them in a potentially reversible manner) might be preferred in mixtures that contain strong oxidizing agents.

Category 3: Amine Groups Bonded to Polymers

As mentioned above, amine groups covalently bonded to polymeric substances can also be used to inhibit the formation of nitrosamines. Some amines (including most primary and secondary amines, which have hydrogen atoms attached to the nitrogen atom) function by forming covalent bonds with at least some types of nitrosating agents; other type of amines reduce nitrosating agents into non-nitrosating nitrogenous species that remain in solution.

One type of polymer which has reactive primary and secondary amine groups attached to it comprises polyethyleneimine (PEI), which is described in Ham 1976. PEI comprises a class of polymers formed by polymerizing ethylene imine (aziridine, $C_2H_5N$). Depending on the polymerization conditions, different forms of PEI can have varying proportions of primary amines (nitrogen atoms coupled to only one carbon atom each; this occurs at each end of each branch in the chain), secondary amines (nitrogen atoms attached to two carbon atoms; this occurs at any nitrogen in a chain that does not have a side-chain coupled to it), and tertiary amines (nitrogen atoms attached to three carbon atoms; this occurs at each nitrogen with a side-chain attached to it). In the examples below, a commercially available PEI with a 1:2:1 molar ratio of primary, secondary, and tertiary amines was used. That particular type of unmodified PEI is soluble in water. The modified PEI, after pyrrole or hydroquinone side groups have been coupled to it, swells and softens but does not dissolve in water. That can be advantageous in some situations; the reactive groups are highly accessible to water-soluble nitrosating agents, but since the polymer does not dissolve, it can be retained in a filter bed or otherwise removed from a mixture after the nitrosating agents have been scavenged or inactivated.

Unmodified PEI can remove nitrosating agents from solution, thereby inhibiting the formation of nitrosamines, as shown in Table 3. Alternately, PEI can be modified by the addition of electron-rich aromatic groups such as pyrrole derivatives (as shown in Polymer V), or by the addition of reducing groups such as hydroquinone derivatives (as shown in Polymer VIII). In either case, the presence of a second type of reactive group, in addition to the competing amine groups which are part of the PEI chain, can lead to even greater effectiveness in sequestering or reducing troublesome nitrosating agents.

As used herein, the phrase "reactive groups bonded to polymeric backbones" is used to include any reactive groups that are covalently bonded to polymeric backbone molecules, either as side chains or moieties, or as reactive groups incorporated into a backbone or side chain. For example, in PEI, a secondary amine group (i.e., a nitrogen atom with carbon atoms on either side and a hydrogen atom attached to the nitrogen) in the backbone chain of a PEI molecule can react with a nitrosating agent, thereby combining the secondary amine group and the nitrosating agent into a sequestered nitrosamine group that is innocuous because it remains bonded to the polymer.

The subject invention also involves a composition of matter, comprising a mixture that contains (1) a fluid with a nitrosating agent, which normally occurs as an unwanted but unavoidable by-product of a desired reaction or component, and (2) a polymeric substance as described above, with reactive groups capable of reacting with the nitrosating agent to form a residue that cannot degrade amine compounds into nitrosamines or other N-nitroso compounds. Such mixtures are useful in various situations: For example, if trace amounts of a nitrosating agent remain in a mixture after treatment as described herein, or if a nitrosating agent will gradually be formed within a mixture during the storage or handling of the mixture due to degradation or reaction of other components, various steps can be taken to prevent those nitrosating agents from forming carcinogenic nitrosamines. The polymeric compound used to remove the majority of the nitrosating agent may be allowed to remain in the mixture; if its reactive groups have not been exhausted, they will continue to scavenge nitrosating agents, protecting against nitrosamine formation. Alternately, a protective polymer can be added to the mixture after the main scavenging or inactivating reaction has been completed (and after the polymer used for the main reaction has been removed, if desired).

Figure 2:
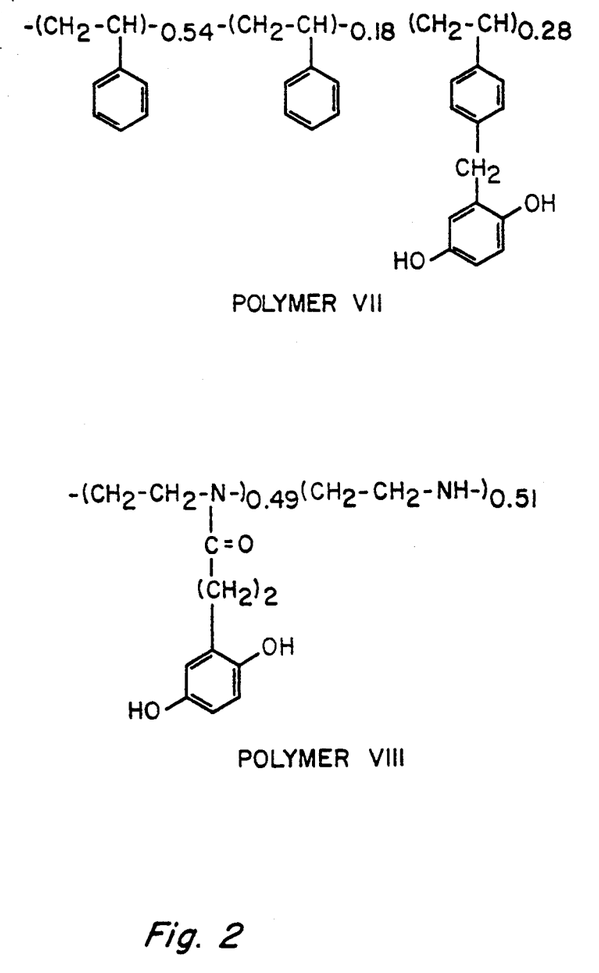
FIG. 2 shows the chemical structures of two polymers that reduce nitrosating agents, thereby converting the nitrosating agents into relatively innocuous agents that are unable to degrade amines into nitrosamines.

Various polymers and reactive groups tested to date were synthesized as described in Examples 1 and 2. Their structural configurations are shown in FIGS. 1 and 2. In those figures, the numerical subscripts indicate the extent of substitution. For example, in Polymer I, 89% (on a molar basis) of the chlorine atoms attached to the original polymer were replaced by pyrrole groups.

These polymers were tested under several conditions, to emulate some of the reaction conditions that would be encountered in a variety of manufacturing processes. The tests involved three chemical components: (1) a polymer with reactive groups; (2) a powerful nitrosating agent, nitrous acid, prepared from the dissolution of sodium nitrite ($NaNO_2$) in acid; and (3) a secondary amine (morpholine) which is highly susceptible to nitrosation.

Some of the tests were done under non-competitive conditions; the polymer to be tested was mixed together and stirred with the nitrous acid for a limited period of time, allowing the polymer to inactivate most of the nitrous acid. The morpholine was subsequently added, and the formation of nitrosomorpholine (NMOR) was assayed and calculated as a percentage of the original nitrosating agent. The reactions are described in detail in Examples 3 and 4; the results are provided in Table 1.

Some of the tests (described in Example 3) involved homogeneous conditions; i.e., the polymers were dissolved in the solvent. Other tests (described in Example 4) involved heterogeneous conditions; the polymers were not dissolved in the solvent and remained in the form of solid particles. Even under heterogeneous conditions using relatively small quantities of the polymers, nitrosamine formation was reduced by more than 90% compared to nitrosamine formation in control samples.

Other tests (described in Example 5) were done under competitive conditions; the polymers and the amine were mixed together, then the nitrous acid was added. This did not give the polymers time to inactivate the nitrous acid before it began nitrosating the amine molecules. Despite those stringent conditions, several polymers were able to inactivate well over 50% (up to nearly 95%) of the nitrous acid, as seen in Table 2. This held true even though, in most situations, the morpholine was present in a higher molar quantity than the reactive groups on the polymers. Because of the stringency of this test (i.e., a powerful nitrosating agent and a highly susceptible amine were used), these results are considered quite impressive.

The polymers described herein offer different levels of protection in different reaction conditions, and specific formulations will be preferred for specific uses, as will be recognized or may be determined by those skilled in the art. The following are offered as examples:

1. Polymers V and VIII work well in aqueous solutions, while other polymers are more effective in certain organic solvents.

2. In mixtures that contain strong oxidizing agents or which will be contacted with strong oxidizing agents, polymers that covalently bind to nitrosating agents (category 1 polymers, as discussed above) are likely to be preferable to polymers that reduce nitrosating agents without removing or bonding to them (category 2 polymers), since the oxidizing agents might convert the reduced nitrosating agents back into dangerous nitrosating agents.

3. Different polymers may cause different types of discoloration. Polymers with pyrrole groups are likely to cause darkening due to a black residue; however, the large majority of the dark residue will be retained with the polymer, so if the polymer is removed from the fluid, the darkening effect will be inconsequential.

Numerous different types of polymers, and various methods of coupling the reactive groups discussed herein to such polymers, are known to those skilled in polymer chemistry. The following is a partial list of such polymers, any of which can be tested using routine experimentation to determine whether they are suitable for removing any specific nitrosating agent from any specific fluid. Many of these polymers (which include various copolymers and derivatives) are commercially available. Those that are not commercially available can be formed either by polymerization of mononers or monomer derivatives, or by chemical modification of other polymers that are available or that can be synthesized from monomers, using techniques known to those skilled in the art.

These polymers can be classified under various functional headings, such as the following:

Acyclic main-chain carbon polymers: poly(alkenes), poly(dienes), poly(acetylenes), poly(acrylics), poly(methacrylics), poly(acrylates), poly(methacrylates), poly(α, β-disubstituted acrylates), poly(acrylamides), poly(methacrylamides), poly(vinylamine), poly(vinylethers), poly(vinylalcohol), poly(vinylacetals), poly(vinylketones), poly(vinylhalides), poly(vinylnitriles), poly(vinylesters), polystyrene, and others.

Main-chain carbocyclic polymers: poly(phenylenes), poly(1,3-cyclohexadiene), and others.

Main-chain acyclic heteroatom polymers: poly(oxides) (either unsubstituted or substituted, such as poly(ethyleneoxide) or poly(epichlorohydrin)), poly(carbonates), poly(esters), poly(anhydrides), poly(urethanes), poly(sulfonates), poly(siloxanes), poly(sulfides), poly(sulfones), poly(amides), poly(hydrazides), poly(ureas), poly(phosphazenes), poly(silanes), poly(silazanes), poly(ethylenimine), and others.

Main-chain heterocyclic polymers: poly(pyrromellitimides), poly(piperazines), and others.

Formaldehyde resins: phenol-formaldehyde resins, p-toluenesulfonamide-formaldehyde resins, and others.

Natural polymers and modified natural polymers: natural rubbers, cellulose, starch, other polysaccharides, natural resins, and others.

Using the test methods described herein, a routine screening process can be performed to select one or more preferred polymeric backbones for use in conjunction with selected reactive groups as described herein, to develop polymers with reactive side groups that are effective in scavenging nitrosating agents from any specific chemical mixture that needs to be protected against nitrosamine formation, at the conditions (temperature, acidity, reaction times, etc.) encountered by that particular mixture in industrial, storage, or other settings.

If desired, the testing procedure for selecting an optimal reactive group for use in reactive polymeric form can involve a preliminary screening test to assess the effectiveness of the reactive group in non-polymeric form against a specific type of nitrosating agent in a specific mixture that needs to be protected. Such tests have been done using various non-polymeric reactive groups, using standardized reaction conditions, as described in Example 6. The results of those tests are in Table 4. The reactive groups listed in Table 4 can be grouped into the categories discussed above as follows:

Category 1 (groups that form covalent bonds with nitrosating agents): pyrrole, 2,5-dimethylpyrrole, 1-benzylpyrrole, 1-benzyl-2,5-dimethylpyrrole, 1,2,5-tribenzylpyrrole, 2,5-diphenyl-pyrrole, 1-benzyl-2,5-diphenylpyrrole, N-methyl-(3-pyridyl)-2-pyrrole, 6,6',12,12',18,18',24,24'-octamethylporphine, and phloroglucinol Category 2 (groups that reduce nitrosating agents into non-bonded residues): hydroquinone, 4-methylcatechol, catechol, guaiacol, pyrrogallol, gallic acid, ascorbic acid, paraphenylenediamine, hydrazine, and ammonium sulfamate As shown in Table 4, all of these reactive molecules show some degree of effectiveness when tested against specific reagents. The relative effectiveness of those groups in other mixtures is likely to vary, as can be determined through routine experimentation. In general, any reactive group that is effective, when not coupled to a polymeric backbone, against a particular nitrosating agent in a particular mixture is a good candidate for coupling to one or more types of polymeric backbones to determine whether that modified polymer is effective against that particular nitrosating agent in that mixture.

TABLE 1

Nitrite-Scavenging Ability of Polymers: Non-Competitive Reactions

| Polymer | Pyrrole or hydroquinone in polymer (mole) | Reaction condition | t (minutes) | NMOR* % |
|---|---|---|---|---|
| 100 mg I | $5.0 \times 10^{-4}$ | homogeneous[b] | 23 | 7.5 |
| 100 mg I | $5.0 \times 10^{-4}$ | heterogeneous[c] | 10 | 4.7 |
| 140 mg II | $5.0 \times 10^{-4}$ | heterogeneous[a] | 1 | 31.2 |
| 140 mg II | $5.0 \times 10^{-4}$ | heterogeneous[a] | 3 | 21.5 |
| 140 mg II | $5.0 \times 10^{-4}$ | heterogeneous[a] | 10 | <0.8 |
| 148 mg III | $5.0 \times 10^{-4}$ | homogeneous[b] | 10 | 2.4 |
| 100 mg IV | $4.4 \times 10^{-4}$ | heterogeneous[a] | 10 | 4.9 |
| 100 mg V | $7.0 \times 10^{-4}$ | heterogeneous[a] | 10 | 4.6 |
| 261 mg VII | $5.0 \times 10^{-4}$ | heterogeneous[a] | 10 | 13.6 |
| None (control) | 0 | homogeneous[a] | 10 | 54.7 |
| 141 mg Celite 560 (control) | 0 | heterogeneous[a] | 10 | 70.3 |

Reaction conditions
[a]Solvent = 3 ml glacial HOAC
[b]Solvent = 3 ml tetrahydrofuran + 2 ml glacial HOAC
[c]Solvent = 3 ml glacial HOAC + 1 ml methanol
In all cases:
$NaNO_2 = 1.25 \times 10^{-4}$ mole
t is the time lapse between addition of $NaNO_2$ and morpholine
Morpholine = $25 \times 10^{-4}$ mole
Incubation time after the addition of morpholine is 15 minutes.
*based on $NaNO_2$

TABLE 2

Inhibition of Nitrosomorpholine (NMOR) Formation by Polymers: Competitive Reactions

| Polymer | Pyrrole or Hydroquinone in polymer (mole) | Morpholine (mole) | NMOR* % |
|---|---|---|---|
| 100 mg IV | $4.4 \times 10^{-4}$ | $25 \times 10^{-4}$ | 97.2 |
| 100 mg IV | $4.4 \times 10^{-4}$ | $5 \times 10^{-4}$ | 53.9 |
| 100 mg V | $7.0 \times 10^{-4}$ | $25 \times 10^{-4}$ | 32.3 |
| 100 mg V | $7.0 \times 10^{-4}$ | $10 \times 10^{-4}$ | 11.3 |
| 100 mg V | $7.0 \times 10^{-4}$ | $5 \times 10^{-4}$ | 8.6 |
| 100 mg V | $7.0 \times 10^{-4}$ | $25 \times 10^{-4}$ | 25.4[a] |
| 100 mg V | $7.0 \times 10^{-4}$ | $10 \times 10^{-4}$ | 21.6[b] |
| 100 mg V | $7.0 \times 10^{-4}$ | $10 \times 10^{-4}$ | 50.4[c] |
| 100 mg VI | $4.4 \times 10^{-4}$ | $25 \times 10^{-4}$ | 44.3 |
| 50 mg VI | $2.2 \times 10^{-4}$ | $25 \times 10^{-4}$ | 41.2 |
| 25 mg VI | $1.1 \times 10^{-4}$ | $25 \times 10^{-4}$ | 53.8 |
| 261 mg VII | $5.0 \times 10^{-4}$ | $25 \times 10^{-4}$ | 60.9 |
| 100 mg VIII | $3.7 \times 10^{-4}$ | $25 \times 10^{-4}$ | 35.5 |
| 100 mg VIII | $3.7 \times 10^{-4}$ | $10 \times 10^{-4}$ | 17.4 |
| 100 mg VIII | $3.7 \times 10^{-4}$ | $5 \times 10^{-4}$ | 5.1 |
| 50 mg VIII | $1.9 \times 10^{-4}$ | $10 \times 10^{-4}$ | 27.3 |
| None (control) | 0 | $25 \times 10^{-4}$ | 99.2 |

Reaction conditions
Heterogeneous
Glacial acetic acid = 3 ml
$NaNO_2 = 1.25 \times 10^{-4}$ mole
Reaction time = 30 minutes
*based on $NaNO_2$
Notes:
[a]Polymer was further washed extensively with water for a week in refrigerator before it was redried in vacuo and used.
[b]Polymer was further washed in methanol for 3 days in refrigerator, redried in vacuo and used.
[c]Polymer was incubated in 3 ml glacial HOAC containing $25 \times 10^{-4}$ moles morpholine at 37° C. for one hour, washed with 12 ml MeOH and 9 ml water, redried in vacuo before use.

TABLE 3

Inhibition of Nitrosomorpholine (NMOR) Formation by Polyethyleneimine (PEI): Competitive Reactions

| 50% Aqueous PEI Solutions (mg) | Moles of Amine Repeat Units $\times 10^{-4}$ | NMOR* % |
|---|---|---|
| 201 | 23.4 | 31.7 |
| 86 | 10.0 | 45.2 |

TABLE 3-continued

Inhibition of Nitrosomorpholine (NMOR) Formation by Polyethyleneimine (PEI): Competitive Reactions

| 50% Aqueous PEI Solutions (mg) | Moles of Amine Repeat Units ×10$^{-4}$ | NMOR* % |
|---|---|---|
| 44 | 5.1 | 61.8 |

Reaction Conditions:
Homogeneous
Glacial acetic acid = 3 ml
Morpholine = 25 × 10$^{-4}$ mole
NaNO$_2$ = 1.25 × 10$^{-4}$ mole
Reaction time = 30 minutes
*based on NaNO$_2$

TABLE 4

Inhibition of Nitrosomorpholine (NMOR) Formation by Monomeric Compounds: Competitive Reactions

| Compounds | Moles (10$^{-4}$) | Reaction Conditions | % NMOR* |
|---|---|---|---|
| Pyrrole | 2.3 | a | 12.0 |
| 2,5-Dimethylpyrrole | 2.0 | a | 4.3 |
| 1-Benzylpyrrole | 1.9 | a | 18.7 |
| 1-Benzyl-2,5-Dimethylpyrrole | 2.3 | a | 3.1 |
| 1,2,5-Tribenzylpyrrole | 2.2 | a | 32.0 |
| 2,5-Diphenylpyrrole | 1.9 | a | 35.6 |
| 1-Benzyl,2,5-diphenylpyrrole | 2.2 | a | 81.6 |
| N-Methyl-(3-pyridyl)-2-pyrrole | 2.1 | a | 83.7 |
| 6,6',12,12',18,18',24,24'-octamethyl-porphine | 1.6 | a | 26.3 |
| Hydrazine | 2.0 | a | 25.7 |
| Ascorbic acid | 2.0 | a | 19.9 |
| 1,4-Phenylenediamine | 1.6 | a | 19.8 |
| Ammonium Sulfamate | 2.0 | a | 32.9 |
| 4-Methylcatechol | 1.5 | a | 13.9 |
| 4-Methylcatechol | 5.0 | b | 14.6 |
| Catechol | 5.0 | b | 17.9 |
| Hydroquinone | 5.0 | b | 17.0 |
| Guaiacol | 5.0 | b | 55.0 |
| Pyrrogallol | 5.0 | b | 9.3 |
| Gallic acid | 5.0 | b | 18.7 |
| Phloroglucinol | 5.0 | b | 0.0 |
| Phloroglucinol | 1.25 | b | 11.3 |

*Based on NaNO$_2$
Reaction Conditions:
Homogeneous
Glacial acetic acid = 3 ml
Reaction time = 30 minutes
a: NaNO$_2$ = 2.0 × 10$^{-4}$ mole
Morpholine = 20 × 10$^{-4}$ mole
b: NaNO$_2$ = 1.25 × 10$^{-4}$ mole
Morpholine = 25 × 10$^{-4}$ mole

EXAMPLES

EXAMPLE 1

Synthesis of Polymers With Pyrrole Groups

FIG. 1 shows the molecular structures of several polymers with reactive groups comprising pyrrole derivatives. Each was synthesized as described below.

Polymer I: Poly(N-pyrrolylmethylstyrene-co-chloromethylstyrene)

Polymer I was synthesized by starting with chloromethylated polystyrene (CMPS; also called poly(vinylbenzyl chloride), sold by Aldrich Chemical, having a composition of 60% meta and 40% para isomers. The potassium salt of pyrrole was prepared by adding potassium (2.45g, 62.6 mmole), freshly cut under heptane, into a solution of pyrrole (4.30 g, 64.1 mmole) in 30 mL of dry tetrahydrofuran (THF), mechanically stirred under dry N$_2$ gas. The mixture was heated at 56° C. for 4 hours until all of the potassium disappeared. A solution of CMPS (4.94 g, 32.2 mmole) in 60 mL dry THF was added dropwise over 45 minutes and the mixture was heated at 59° C. for 19 hours. The resulting mixture was centrifuged to remove the insoluble salts, and the supernatant was added dropwise to 900 mL methanol with stirring. The precipitate was filtered in a fritted glass funnel, washed with 300 mL methanol, and dried in vacuo. The product was further purified by redissolving it in 50 mL THF and the resulting solution was centrifuged. The supernatant was added dropwise to 500 mL methanol with stirring to precipitate out a polymeric powder (Polymer I) which was filtered on a fritted glass funnel, washed with 200 mL methanol, and dried in vacuo. The presence of the pyrrole group was confirmed by $^1$H and $^{13}$C NMR analysis. Elemental analysis (83.70% C, 6.96% N, 0.66% Cl) indicated that about 89% of the chloride atoms on the starting resin were replaced by pyrrole groups. There was 5.0 mmole pyrrole per gram of polymer.

Polymer II: Poly(N-(2,5-dimethyl)pyrrolylmethylstyrene-co-chloromethylstyrene)

The potassium salt of 2,5-dimethylpyrrole was prepared by adding potassium (1.40 g, 35.8 mmole), freshly cut under dry heptane, into a solution of 2,5-dimethylpyrrole (4.26 g, 44.8 mmole) in 50 mL dry THF, mechanically stirred under dry N$_2$ gas. The mixture was gently refluxed until all potassium had reacted and any trace of blue color in the slurry disappeared.

A solution of CMPS (4.54 g, 29.8 mmole) in 50 mL THF was added dropwise over ½ hour. The mixture was refluxed for 16 hours. Insoluble swollen gel particles were observed, indicated that crosslinking had occurred. The mixture was evaporated to about 50 mL, and 350 mL of methanol:water (3:1) was added. After stirring for 1 hr, the precipitated polymer lumps were filtered in a fritted glass funnel, washed with water then methanol, then dried in vacuo. The polymer was further purified as follows: after swelling in 50 mL THF with stirring for 2 hours, the polymer was precipitated by the addition of 350 mL methanol with continuous stirring. The polymer was then filtered, washed with methanol, dried in vacuo, and ground up with a mortar and pestle. The process was repeated. Final recovery of Polymer II was 5.02 g. Elemental analysis (81.54% C, 7.66% H, 4.94% N) indicated that approximately 68% of the chloride atoms on the resin were replaced by 2,5-dimethylpyrrole. There was about 3.5 mmole 2,5-dimethylpyrrole per gram polymer.

Polymer III: Poly(N-pyrrolylmethylethyleneoxide-co-epichlorohydrin-co-ethyleneoxide)

Polymer III was synthesized by the method described in U.S. Pat. No. 3,844,985 (Fukutani et al. 1974). An epichlorohydrin/ ethyleneoxide copolymer (Scientific Polymer Products; 2.01 g, 17.3 mmole CH$_2$Cl) was dissolved overnight in 50 mL dimethylformamide (DMF). A small amount of polymer which remained undissolved was separated by centrifugation, washed with methanol and water, and dried; the 0.05 g weight of that residue indicated that 1.96 g (16.9 mmole CH$_2$Cl) of dissolved copolymer was involved in the subsequent reactions.

Pyrrole (5.07 g, 75.5 mmole), NaOH (2.52 g, 63.0 mmole), and DMF (50 mL) were added to the dissolved copolymer, and the mixture was stirred at 80° C. under dry N$_2$ for 7 hours, then cooled. The polymer was precipitated by adding the solution dropwise to 1 liter of methanol:water (3:7). A very fine suspension was formed, which was collected by centrifugation at 10,000 G for 20 minutes. The polymer was then washed with methanol and dried. $^1$H and $^{13}$C NMR in CDCl$_3$ showed approximately 28% pyrrole, which is equivalent to 3.4 mmole pyrrole per gram of polymer.

The polymer was further purified by dissolving it in 16 mL THF and precipitating it in 150 mL methanol. Again, a fine suspension was formed, which was separated by centrifugation, washed with methanol, and dried in vacuo. Recovery was 1.39 g; most of the loss was through the transfer processes. $^1$H-NMR indicated that the bound pyrrole content (28%) was unchanged from the value obtained prior to purification. The polymer was soluble in THF and chloroform, and insoluble in water, methanol, and dimethylsulfoxide (DMSO).

Polymer IV: Poly(N-(2,5-dimethyl)pyrrolylmethylstyrene-co-chloromethylstyrene)

Polymer IV is structurally comparable to polymer II, but it was synthesized by a different method which provided a higher quantity of dimethylpyrrole groups attached to the polymer. The first step involved a "Gabriel reaction" (Gibson and Bailey, 1976), as follows. Potassium phthalimide (7.29 g, 39.4 mmole) was added to a 250 mL round-bottom flask equipped with an overhead stirrer which contained a solution of CMPS (5.00 g, 32.8 mmole Cl) in 50 mL freshly distilled DMF under a nitrogen atmosphere. The mixture was heated and stirred at 100° C. for 5 hours then cooled. The mostly clear product mixture was added dropwise with stirring to a 900 mL 8:1 water:methanol mixture, to give a fine white powder which was collected on a fitted funnel, washed in water and methanol, and dried in vacuo. The yield was 8.30 g polymer. Infrared spectra of the polymer film, cast from chloroform solution onto an NaCl plate, showed two carbonyl peaks of the imide at 1771 and 1714 cm$^{-1}$.

In the second step, the powder described above (6.80 g, approx. 26 mmole) was added to 125 mL ethanol to form a white slurry. Hydrazine (10 mL of 55% solution, 172 mmole) was added and the mixture was refluxed for 5 hours. The slurry became very viscous, because the poly(aminomethylstyrene) product is soluble in ethanol while the residue is the insoluble phthalhydrazide byproduct. The residue was filtered off and discarded; the filtrate was evaporated and dried in vacuo to constant weight (3.15 g). It was purified by forming a solution in 50 mL ethanol, which was centrifuged at 10,000 G for 20 minutes. The supernatant was dried to constant weight to give clear polymer flakes (2.89 g). This polymer is soluble in ethanol, 50% aqueous ethanol, dilute HCl, and dimethylsulfoxide, and insoluble in water, chloroform, toluene, and DMF. The IR spectra of a polymer film showed no carbonyl peaks and strong absorbance at 3279 and 3350 cm$^{-1}$ due to NH stretching.

The third step involved a Knorr reaction. The polymer generated by the second step (1.40 g, 10.5 mmole), 2,5-hexanedione (1.90 g, 16.6 mmole), 15 mL ethanol, and 0.84 g glacial acetic acid (14 mmole) were combined and refluxed with stirring for 4 hours under nitrogen. The resulting solids were filtered, washed consecutively with ethanol, water, KHCO$_3$, water, and ethanol, and dried in vacuo, yielding 1.54 g of Polymer IV, which is insoluble in chloroform, DMF, and tetrahydrofuran. Infrared spectra from KBr pellets showed characteristic pyrrole absorption bands which were not present in the starting polymer (1520 and 1407 cm$^{-1}$ ring stretching, 1299 cm$^{-1}$ C-N stretching, and 749 cm$^{-1}$ C-H out-of- plane vibration). There were two weak peaks at 1694 cm$^{-1}$ and 1657 cm$^{-1}$, probably from residual dione, indicating incomplete cyclization. Elemental analysis gave about 89% pyrrole derivatization, compared to 68% for Polymer II.

Polymer V: Poly((N-(2-pyrrolylmethyl)-ethyleneimine)-co-ethyleneimine)

Polymer V was prepared using commercially available polyethyleneimine (PEI; supplied as 50 wt.% solution in water, by Aldrich Chemical Company) as a starting material. This PEI contains a 1:2:1 ratio of primary, secondary, and tertiary amines. A modified version of a Mannich reaction was performed (Herz et al. 1947 and Herz et al. 1951 described Mannich reactions on low molecular weight compounds). A solution of PEI (20 g of the 50% solution, which contained about 0.116 moles of secondary amine and 0.058 moles each of primary and tertiary amine), diluted with 20 mL of water, was cooled on ice and stirred, and concentrate HCl (23.27 g, 0.233 moles) was added slowly. The solution was warmed to room temperature, and 37% formalin (13.36 g, 0.165 mole) was added. The resulting solution was added dropwise to a 200 mL flask equipped with condenser and mechanical stirrer, containing pyrrole (10.53 g, 0.157 mole) in 70 mL water, which was cooled in a cold water bath to keep the reaction temperature below 60° C. After four hours, the reaction product (a yellow slurry) was added to 350 mL water and the mixture was made alkaline (pH 11-12) with 30 mL 20% NaOH. Insoluble solids were separated by centrifugation, washed several times with water followed by centrifugation, then dried to constant weight. The yield of Polymer V, which was brown colored, was 19.52 g. This polymer is insoluble in water, ethanol, chloroform, DMSO, DMF, and acetic acid. IR spectra (KBr pellets) showed pyrrole peaks similar to those found in 2-dimethylaminomethylpyrrole (Jones 1963): 1456 cm$^{-1}$ (ring stretching), 1093 cm$^{-1}$ and 1031 cm$^{-1}$ (CH in plane deformation), and 774 cm$^{-1}$ (CH out of plane vibration). Elemental analysis indicated about 85% pyrrole incorporation.

Polymer VI: Poly(acryloyl chloride-co-acrylic acid-co-N-methyl-N-2-pyrrolylmethylacrylamide).

The procedure used to prepare Polymer VI involved a reaction between poly(acryloyl chloride) (Polysciences) and 2-methylaminomethyl pyrrole (Tsuchida et al. 1973). Dry pyridine (1.16 g, 14.7 mmole) was added to a 250 mL flask equipped with overhead stirrer, reflux condenser, and dropping funnel, containing 2-methylaminomethyl pyrrole (1.54 g, 14.0 mmole) in dry dioxane (23 mL). Poly(acryloyl chloride) solution in dioxane (5.10 g of 25% solution, 14.10 mmole) was added dropwise. A bright yellow slurry was formed.

After stirring overnight, the slurry was diluted with water, filtered through a fritted glass funnel, and washed extensively with water then methanol. As the funnel became blocked, washing was done by centrifugation of the powder suspension in methanol followed by decantation. The powder was resuspended in methanol and washed once more as described. Drying in vacuo gave 1.47 g yellow powder which was not soluble in acetone or benzene, and was partially soluble in DMF, chloroform, and glacial acetic acid. The IR spectra (KBr pellet) of the product was compared to the starting polymer. The carbonyl peak was at 1629 cm$^{-1}$, indicating an amide instead of acid chloride at 1780 cm$^{-1}$ as in the starting polymer. New peaks at 1560 cm$^{-1}$ (shoulder), 1487 cm$^{-1}$, and 1413 cm$^{-1}$ are believed to come from pyrrole ring stretching. Elemental analysis indicated approximately 53% by mole of the incorporated pyrrole.

EXAMPLE 2

Synthesis of Polymers With Hydroquinone Derivatives

As discussed above, certain types of reactive groups such as hydroquinone, when coupled to polymeric backbones and used as described herein, are presumed to act primarily by reducing nitrosating agents into non-nitrosating agents, without covalently binding the nitrosating agents to the polymers. Two such polymers are designated as Polymers VII and VIII. The synthesis of those two polymers is described in this example.

Polymer VII: Poly(styrene-co-chloromethylstyrene-co-2,5-dihydroxybenzyl styrene)

This polymer was prepared from a chloromethylated cross-linked polystyrene beads, also called Merrifield's resin, commercially available from Biorad (type SX1, 4.15 meq chloromethyl per gram). Dioxane (80 mL, freshly distilled over Na and benzophenone), hydroquinone (6.85 g, 62.3 meq), and Biorad SXI beads (10 g, 4.15 meq/g) were placed in a 250 mL flask with a mechanical stirrer and reflux condenser. The mixture was stirred for ½ hour, then zinc chloride (0.43 g, 3.2 meq) was added. The mixture was refluxed for 7 hours with stirring, then transferred to a cellulose extraction thimble, and the dioxane was allowed to drain off. The beads were extracted with methanol in a Soxhlet extractor for 24 hours, then dried in vacuo at room temperature to constant weight, giving 11.3 g of cream-colored beads which turned orange during storage. The IR spectra (KBr pellet) showed new peaks (compared to the starting polymer) at 3524 cm$^{-1}$ (OH), 1254 cm$^{-1}$ (sharp), 1192 cm$^{-1}$ (broad), 1118 cm$^{-1}$ (sharp), 1079 cm$^{-1}$ (sharp), (CO stretch in phenol), and 870 cm$^{-1}$ (CH bending in new aromatics). Elemental analysis indicated that the polymer contains approximately 28% hydroquinone.

Polymer VIII: Poly((N-(2-hydroquinonepropanoyl)-ethyleneimine)-co-ethyleneimine)

Polymer VIII was prepared by reacting PEI with a lactone derivative of dimethoxycinnamic acid as described by Taylor (1962). The lactone was prepared using known procedures (Anliker et al. 1957; Westfahl et al. 1954; Fichter et al. 1927). 2,5-dimethoxycinnamic acid (Aldrich Chemical Company, 2.73 g, 3.1 mmole) was added to a mixture of 10% palladium on carbon catalyst (Aldrich Chemical Company, 0.54 g) in 100 mL 95% ethanol under 34 psi hydrogen gas. The mixture was shaken for 4 hours, converting the double bond into a single bond with saturated carbons. The catalyst was filtered off and the filtrate was evaporated to dryness to give 2.64 g of 2,5-dimethoxyhydrocinnamic acid (95% yield). This intermediate (2.20 g, 10.5 mmole) was refluxed in 48% aqueous HBr (15 mL, 132 mmole) for 2.5 hours. As the solution was cooled, white crystals appeared. The mixture was cooled further to 2° C., then the crystals were filtered off, washed with cold water, and dried in vacuo, yielding 1.40 g (81%), melting point 160°-161° C. (reported mp 162°-163° C.). 1H-NMR in D6-acetone confirmed the structure. IR spectra (KBr pellets) showed the lactone band at 1736 cm$^{-1}$.

The lactone intermediate (1.12 g, 6.82 mmole) was dissolved in 15 mL methanol, and a solution of PEI (0.7693 g of 50% aqueous solution, 8.95 mmole PEI) in 10 mL water was added. The mixture was refluxed with stirring under nitrogen gas for 23 hours, then cooled and added dropwise to 400 mL acetone, which caused the polymer to precipitate. The solvent was decanted, and the polymer was washed several times with acetone and dried in vacuo. The yield was 1.01 g. Infrared spectra (KBr pellets) showed an amide peak at 1641 cm$^{-1}$ and no lactone peak at 1736 cm$^{-1}$. The polymer is not soluble in acetic acid, aqueous potassium hydroxide solution, DMF, or DMSO. Elemental analysis indicated approximately 49% hydroquinone attachment.

EXAMPLE 3

Non-competitive Reactions, Homogeneous Conditions

Several of the polymers described above were tested for their ability to block nitrosation, using a non-competitive reaction protocol that involved reacting the polymer with a nitrosating agent (HNO$_2$) before a susceptible amine (morpholine) was added.

The polymers tested using homogeneous conditions include Polymers I and III. In this protocol, polymers I or III containing 5×10$^{-4}$ moles pyrrole was dissolved in 3 mL THF, in a 2 dram vial with a magnetic stirrer. The THF solvent completely dissolved those polymers. Other polymers were not tested in homogenous conditions, because they could not be fully dissolved in the solvents used herein.

Glacial acetic acid (2 mL) and an accurately weighed amount of 2,6-dimethylnitrosomorpholine (DMNM; amounts ranged from 0.5 to 1.0×10$^{-4}$ modes) were added and the solution was equilibrated at 37° C. in a constant temperature bath for 30 minutes. The DMNM served as an internal standard, so that the yields of nitrosomorpholine (NMOR) from the analytical procedure could be determined, as follows: the quantity of DMNM which appeared in the sample that was chromatographically analyzed was divided by the starting quantity of DMNM, to obtain a fractional figure which was regarded as the yield of the chromatographic sample. The same fractional yield of morpholine (either unmodified or nitrosated) was also present in the sample that was analyzed.

After the polymer and DMNM were equilibrated, a solution of sodium nitrite, NaNO$_2$ (62.5 ul (microliters) of 2M solution, 1.25×10$^{-4}$ moles) was added. The sodium nitrite reacted with the acetic acid to form nitrous acid, HNO$_2$, a strong nitrosating agent. The solutions were stirred for varying periods of time as indicated in Table 1. During that incubation period, the pyrrole groups that were bound to the polymer reacted with some fraction of the nitrosating agent, thereby inactivating the nitrosating agent and binding it to the polymer.

At the end of the incubation period, morpholine was added (218 ul, 25×10$^{-4}$ moles) The mixture was incubated for another 15 minutes; during that time, HNO$_2$ that was not scavenged by the polymer reacted with the morpholine to form N-nitrosomorpholine. The reaction was quenched by adding the mixture to 10 mL methanol.

Polymers I and III behaved differently. Polymer I precipitated to a brown powder, so the mixture was filtered through filter paper to a round bottom flask containing 30 mL of 2 molar K$_2$CO$_3$. Containers and filter paper were carefully rinsed with 4 mL methanol and 7 mL water. Volatile solvents in the combined filtrate were removed on a rotary evaporator, and the remaining aqueous solution was extracted with 4×12 mL CH$_2$Cl$_2$. This extract was dried with MgSO$_4$, filtered, and analyzed by gas chromatography with a capillary column (Supelco SP-5, 0.25 mm inside diameter×30 m length) and a flame ionization detector to determine the quantity of NMOR.

Polymer III did not precipitate out in 10 mL methanol, but on addition of 30 mL 2M $K_2CO_3$, it precipitated out to form a cloudy mixture which was filtered to a round bottom flask. Containers and paper were rinsed with a total of 10 mL methanol and 10 mL water. Following that step, the same procedure of removal of volatile solvents, extraction with $CH_2Cl_2$ and gas chromatography analysis as used with Polymer I was followed. The percentages shown in Table 1 indicate the quantity of nitrosomorpholine divided by the quantity of nitrosating agent; a low percentage for a specific polymer indicates that the polymer efficiently and desirably scavenged a large fraction of the nitrosating agent.

EXAMPLE 4

Non-competitive Reactions, Heterogeneous Conditions

Because some of the preferred embodiments of this invention involve reactive groups bonded to insoluble particulate polymers (e.g., for use in filter beds), it was decided to test all of the polymers shown in FIG. 1 except polymer III in heterogeneous conditions. In general, heterogeneous reactions pose a higher level of difficulty than homogeneous (fully dissolved) polymers. If a polymer is dissolved in a solvent, it is presumed that every reactive group attached to the polymer can contact and scavenge the nitrosating agents. By contrast, under heterogeneous conditions, the effective scavenging groups are presumed to be limited to groups that are exposed on the surfaces of the beads or droplets, unless the internal sites can be reached by diffusion.

Heterogeneous conditions were generated by suspending polymers in vigorously stirred liquids such as acetic acid which did not render the polymers soluble. Polymer I (a quantity of powder containing $5 \times 10^{-4}$ moles pyrrole) was suspended in 3 mL glacial acetic acid; 1 mL of methanol was added to prevent the powder from sticking together. Polymers II, IV, V and VII (with 4.4 to $7.0 \times 10^{-4}$ moles pyrrole or hydroquinone) were suspended in acetic acid; no methanol was needed to prevent agglomeration. Polymer III was not tested under heterogeneous conditions, because it was not prepared as a loose powder.

DMNM was added as internal standard and the reaction was carried out as in Example 3. Quenching of the reaction was affected by adding the mixture to 30 mL 2M $K_2CO_3$, followed by filtering the resulting mixture through filter paper to a round bottom flask. Containers and filter paper were carefully rinsed with a total of 10 mL methanol and 10 mL water. Subsequent steps are the same as in Example 3. The results are in Table 1.

EXAMPLE 5

Competitive Reactions, Heterogeneous Conditions

In some situations it is desirable to prevent nitrosamine formation in mixtures that contain both a nitrosating agent and an amine that is subject to nitrosation. In such situations the amine and the protective agent are effectively competing with each other to react with the nitrosating agent. If the amine and the protective agent are present in equimolar concentrations and if neither reacts more rapidly or preferentially with the nitrosating agent(s), the expected reduction in nitrosamines would be 50%. A reduction greater than 50% indicates that a protective agent offers a higher and more desirable level of protection.

The ability of several polymers containing pyrrole or hydroquinone groups to block nitrosamine formation under competitive conditions was assessed. The heterogeneous reaction conditions described in Example 4 were used, modified as follows:

1. The protective polymer and the morpholine were added to 3 mL of glacial acetic acid and stirred for 30 minutes at 37° C. Quantities used are specified in Table 2.

2. Sodium nitrite ($1.25 \times 10^{-4}$ moles) was added, and the mixture stirred for 30 minutes at 37° C.

The reaction was quenched and worked up, and nitrosomorpholine formation was assayed, using DMNM as an internal standard, as described in Example 4. The results, expressed in terms of the effective reduction in NMOR formation, are given in Table 2.

When Polymers V and VIII were tested with morpholine concentration approximately the same as the reactive group concentration in polymers, nitrosomorpholine formation was reduced to 11% or less, indicating that these polymers are highly efficient nitrosation inhibitors. When the morpholine concentration was increased to several times the reactive group concentration in polymers, thus presenting a more demanding test of the effectiveness of the polymers, Polymers V, VI, and VIII still could compete and reduce the nitrosomorpholine formation to less that 50%. Polymers IV and VII were relatively less effective; however, they performed very well under non-competitive conditions as seen in Table 1.

If a polymer is effective under competitive conditions, it is reasonably certain that it will be even more effective under non-competitive conditions; therefore, Polymers VI and VIII were not tested under non-competitive conditions.

EXAMPLE 6

Testing on Non-Polymeric Reactive Groups

Various types of molecules that can be coupled to polymeric backbones and used as described herein were evaluated, in non-polymeric form, to assess their relative abilities to scavenge nitrosating agents. These compounds are listed in Table 4, along with the results of tests that used the same competitive reaction conditions described in Example 5, with one exception: the reaction conditions were homogeneous, since the non-polymeric compounds are soluble in the solvents used.

Thus, the compounds and methods described above satisfy the objectives of the invention and provide an effective method of inactivating nitrosating agents in fluid mixtures.

As will be recognized by those skilled in the art, various modifications to, and other uses and applications for, the specific embodiments described herein may be made without departing from the teachings and scope of this invention. Such modifications which do not depart from the spirit and scope of this invention are deemed to be covered by the invention, which is limited only by the claims below.

REFERENCES

Anliker, R. et al., "A Synthetic Approach To Polycyclic Hydroaromatic Systems", J. Amer. Chem. Soc. 79: 220 (1957).

Fichter, F. and Schlager, E., "Electrochemical Oxidation of Hydroquinone II", Helv. Chim. Acta 10: 408 (1927).

Gibson, H. W. and Bailey, F. C., "Chemical Modification of Polymers. 9. Attack of Nitrogen Anions on Poly-(vinylbenzyl chloride)", *Macromolecules* 9: 688 (1976).

Gray, J. I. and Dugan, L. R. Jr., "Inhibition of N-Nitrosamine Formation in Model Food Systems,"*J. Food Sci.* 40:981 (1975).

Ham, G. E. "Alkylenimine Polymers", *Encyclopedia of Polymer Science & Technology*, Suppl. 1, page 25, Wiley (1976).

Herz, W. et al., "The Preparation of Some Monosubstituted Derivatives of Pyrrole by the Mannich Reaction", *J. Am. Chem. Soc.* 69: 1698 (1947).

Herz, W. and Rogers, J. L., "Mannich Bases from N-Substituted Pyrroles," *J. Am. Chem. Soc.* 73: 4921 (1951).

Jones, "Pyrrole Studies. I. The Infrared Spectra of 2-Monosubstituted Pyrroles", *Aust. J. Chem.* 16: 93 (1963).

Lowry, L. H. and Richardson, K. S., *Mechanism and Theory in Organic Chemistry* (3rd edition; Harper and Row, New York, 1987).

Taylor, L. D., "A Convenient Preparation of a Hydroquinone Redox Polymer", *J. Appl. Polym. Sci.* 6: S13 (1962).

Tsuchida, E. et al., "Synthesis and Polymerization of Various Vinyl-Type Monomers Containing the Pyrrole Ring", *J. Polym Sci., Polym. Chem. Ed.* 11: 853 (1973).

Westfahl, J. C. and Gresham, T. L., "Vinylidene Cyanide. V. The Aluminum Chloride Catalyzed Reaction of Vinylidene Cyanide and Aromatic Compounds", *J. Am. Chem. Soc.* 76: 1076 (1954).

We claim:

1. A method for reducing the concentration of an unwanted nitrosating agent in a fluidized material, comprising the step of contacting a fluidized material containing an unwanted nitrosating agent with a polymeric substance which is insoluble in said fluidized material, wherein the polymeric substance comprises reactive groups bonded to polymeric backbones, under conditions that allow the reactive groups to convert the unwanted nitrosating agent into residue molecules that cannot react with amine compounds in solution to degrade the amine compounds into nitrosamines or nitroso compounds.

2. The method of claim 1, wherein the reactive groups comprise electron-rich aromatic groups.

3. The method of claim 2, wherein the electron-rich aromatic groups would have a pKa value of greater than about 4.4, if coupled to a carboxyl group and not coupled to a polymer.

4. The method of claim 2 wherein the electron-rich aromatic groups are selected from the class of compounds consisting of:
   a. pyrrole groups; and,
   b. pyrrole derivatives formed by ring substitution or fusion wherein a substituent which is coupled to pyrrole to form the pyrrole derivatives is either neutral or electron-donating relative to hydrogen.

5. The method of claim 2 wherein the electron-rich aromatic groups are selected from the class of compounds consisting of:
   a. indole;
   b. derivatives of indole formed by ring substitution or fusion;
   c. derivatives of benzene, thiophene, or furan containing electron-donating substituents.

6. The method of claim 1 wherein the reactive groups are bonded to a polymeric substance that contains primary or secondary amine groups.

7. The method of claim 1 wherein the reactive groups are bonded to a polymeric backbone comprising polyethyleneimine or a derivative thereof.

8. The method of claim 2 wherein the reactive groups are bonded to a polymeric backbone comprising polyethyleneimine or a derivative thereof.

9. The method of claim 1 wherein the reactive groups include at least two different types of reactive groups, wherein:
   a. a first type of reactive group comprises electron-rich aromatic groups; and,
   b. a second type of reactive group comprises amine groups.

10. The method of claim 1 wherein the reactive groups include at least two different types of reactive groups, wherein:
    a. a first type of reactive group comprises electron-rich aromatic groups; and,
    b. a second type of reactive group comprises reducing groups which have a reduction potential of less than 1 volt compared to a hydrogen electrode.

11. The method of claim 1 wherein the reactive groups include at least three different types of reactive groups, wherein:
    a. a first type of reactive group comprises electron-rich aromatic groups;
    b. a second type of reactive group comprises reducing groups which have a reduction potential of less than 1 volt compared to a hydrogen electrode; and,
    c. a third type of reactive group comprises amine groups.

12. The method of claim 11, wherein the first and second types of reactive groups are covalently bonded to a polymeric backbone comprising polyethyleneimine or a derivative thereof.

13. A method for lowering the concentration of an unwanted nitrosating agent in a fluidized material, comprising the step of contacting a fluidized material containing an unwanted nitrosating agent with a polymeric substance which is insoluble in said fluidized material, wherein the polymeric substance comprises reducing groups bonded to a polymeric backbones, under conditions that allow the reducing groups to reduce the unwanted nitrosating agent into residue molecules that cannot react with amine compounds in solution to degrade the amine compounds into nitrosamines or nitroso compounds.

14. The method of claim 13, wherein the reducing groups have a reduction potential of less than 1 volt compared to a hydrogen electrode.

15. The method of claim 13, wherein the reducing groups comprise hydroquinone or derivatives thereof.

16. The method of claim 13, wherein the reducing groups comprise catechol or derivatives thereof.

17. The method of claim 13, wherein the reducing groups are coupled to polymeric backbones that contain primary or secondary amine groups.

18. The method of claim 17 wherein the reducing groups are covalently bonded to polymeric backbones comprising polyethyleneimine or a derivative thereof.

19. A method for lowering the concentration of an unwanted nitrosating agent in a fluidized material, comprising the step of contacting a fluidized material containing an unwanted nitrosating agent with a polymeric substance comprising primary or secondary amine groups, under conditions that allow the unwanted nitrosating agent to convert the primary or secondary amine groups of the polymeric substance into nitrosamines or nitroso groups that remain covalently bonded to the polymeric substance.

20. The method of claim 19, wherein the polymeric substance comprises polyethyleneimine or a derivative thereof.

21. A composition of matter, comprising a fluid which contains:
 a. an unwanted nitrosating agent; and,
 b. a polymeric substance which is insoluble in said fluidized material, wherein the polymeric substance comprises reactive groups capable of reacting with the unwanted nitrosating agent, in a quantity sufficient to convert a substantial portion of the unwanted nitrosating agent into residues that cannot degrade amine compounds into nitrosamines or nitroso compounds.

22. The composition of matter of claim 21, wherein the reactive groups comprise electron-rich aromatic groups.

23. The composition of matter of claim 22, wherein the electron-rich aromatic substances would have a pKa value of greater than about 4.4, if coupled to a carboxyl group and not coupled to a polymer.

24. The composition of matter of claim 22 wherein the electron-rich aromatic groups are selected from the class of compounds consisting of:
 a. pyrrole groups; and,
 b. pyrrole derivatives formed by ring substitution or fusion wherein a substituent which is coupled to pyrrole to form the pyrrole derivatives is either neutral or electron-donating relative to hydrogen.

25. The composition of matter of claim 22 wherein the electron-rich aromatic groups are selected from the class of compounds consisting of:
 a. indole;
 b. derivatives of indole formed by ring substitution or fusion;
 c. derivatives of benzene, thiophene, or furan containing electron-donating substituents.

26. The composition of matter of claim 22 wherein the reactive groups are bonded to a polymeric substance that contains primary or secondary amine groups.

27. The composition of matter of claim 21 wherein the reactive groups are bonded to a polymeric backbone comprising polyethyleneimine or a derivative thereof.

28. The composition of matter of claim 22 wherein the electron-rich aromatic groups are bonded to a polymeric backbone comprising polyethyleneimine or a derivative thereof.

29. The composition of matter of claim 21 wherein the reactive groups include at least two different types of reactive groups, wherein:
 a. a first type of reactive group comprises electron-rich aromatic groups; and,
 b. a second type of reactive group comprises primary or secondary amine groups.

30. The composition of matter of claim 21 wherein the reactive groups include at least two different types of reactive groups, wherein:
 a. a first type of reactive group comprises electron-rich aromatic groups; and,
 b. a second type of reactive group comprises reducing groups which have a reduction potential of less than 1 volt compared to a hydrogen electrode.

31. The composition of matter of claim 21 wherein the reactive groups include at least three different types of reactive groups, wherein:
 a. a first type of reactive group comprises electron-rich aromatic groups;
 b. a second type of reactive group comprises reducing groups which have a reduction potential of less than 1 volt compared to a hydrogen electrode; and,
 c. a third type of reactive group comprises primary or secondary amine groups.

32. The composition of matter of claim 31 wherein the first and second types of reactive groups are covalently bonded to a polymeric backbone comprising polyethyleneimine or a derivative thereof.

33. A composition of matter, comprising a fluid which contains:
 a. an unwanted nitrosating agent; and,
 b. a polymeric substance which is insoluble in said fluidized material, wherein the polymeric substance comprises reducing groups which have a reduction potential of less than 1 volt compared to a hydrogen electrode, in a quantity sufficient to convert a substantial portion of the unwanted nitrosating agent into residues that cannot degrade amine compounds into nitrosamines or nitroso compounds.

34. A composition of matter, comprising a fluid which contains:
 a. an unwanted nitrosating agent; and,
 b. a polymeric substance with primary or secondary amine groups, in a quantity sufficient to convert a substantial portion of the unwanted nitrosating agent into residues that cannot degrade amine compounds into nitrosamines or nitroso compounds.

35. The composition of matter of claim 34, wherein the polymeric substances comprises polyethyleneimine or a derivative thereof.

36. A method for reducing the concentration of an unwanted nitrosating agent in a fluidized material, comprising the step of contacting a fluidized material containing an unwanted nitrosating agent with a polymeric substance comprising polymeric backbones containing primary or secondary amine groups, under conditions that allow the primary or secondary amine groups of the polymeric backbones to convert the unwanted nitrosating agent into residue molecules that cannot react with amine compounds in solution to degrade amine compounds in solution into nitrosamines or nitroso compounds.

37. A method of claim 36 wherein the polymeric backbone comprises polyethyleneimine or a derivative thereof.

38. A method of claim 36 wherein additional reactive groups are covalently bonded to the polymeric backbones, wherein said reactive groups are selected from the group consisting of:
 (a) electron-rich aromatic groups which would have a pKa value of greater than about 4.4 if coupled to a carboxyl group and not coupled to a polymer, and
 (b) reducing groups which have a reduction potential of less than 1 volt compared to a hydrogen electrode, and wherein said reactive groups are capable of converting the unwanted nitrosating agent in the fluidized material into residue molecules that cannot react with amine compounds in solution to degrade the amine compounds in solution into nitrosamine or nitroso compounds.

* * * * *